(12) United States Patent
Pettersen et al.

(10) Patent No.: US 8,923,095 B2
(45) Date of Patent: Dec. 30, 2014

(54) SHORT CIRCUIT PROTECTION FOR SERIALLY CONNECTED NODES IN A HYDROCARBON EXPLORATION OR PRODUCTION ELECTRICAL SYSTEM

(75) Inventors: Jostein Fonneland Pettersen, Høyenhallveien (NO); Alain Rhelimi, La Celle Saint Cloud (FR)

(73) Assignee: WesternGeco L.L.C., Houston, TX (US)

( * ) Notice: Subject to any disclaimer, the term of this patent is extended or adjusted under 35 U.S.C. 154(b) by 1936 days.

(21) Appl. No.: 11/640,786

(22) Filed: Dec. 18, 2006

(65) Prior Publication Data

US 2008/0008041 A1   Jan. 10, 2008

Related U.S. Application Data

(60) Provisional application No. 60/806,604, filed on Jul. 5, 2006.

(51) Int. Cl.
*G01V 1/00* (2006.01)
*G01V 1/16* (2006.01)
*G01V 11/00* (2006.01)

(52) U.S. Cl.
CPC .............. *G01V 1/16* (2013.01); *G01V 11/002* (2013.01)
USPC ............................................. 367/76; 367/56

(58) Field of Classification Search
CPC ............................... G01V 1/16; G01V 11/002
USPC .................................................. 367/56, 76, 77
See application file for complete search history.

(56) References Cited

U.S. PATENT DOCUMENTS

| | | | |
|---|---|---|---|
| 4,166,270 A | 8/1979 | Brastins et al. | 367/13 |
| 4,503,526 A | 3/1985 | Beauducei et al. | 367/20 |
| 4,967,400 A * | 10/1990 | Woods | 367/21 |
| 5,172,345 A * | 12/1992 | van der Poel | 367/178 |
| 5,627,798 A * | 5/1997 | Siems et al. | 367/76 |
| 5,883,856 A | 3/1999 | Carroll et al. | 367/13 |
| 7,112,896 B2 * | 9/2006 | Kinnard | 307/43 |
| 7,176,589 B2 | 2/2007 | Rouquette | 307/17 |
| 7,245,559 B2 * | 7/2007 | McDonald et al. | 367/136 |
| 7,453,763 B2 * | 11/2008 | Johnstad | 367/20 |
| 2003/0016587 A1 * | 1/2003 | Wilson et al. | 367/13 |
| 2003/0053375 A1 * | 3/2003 | Watanabe et al. | 367/131 |
| 2003/0058127 A1 * | 3/2003 | Babour et al. | 340/854.3 |

OTHER PUBLICATIONS

Specification, Claims, Abstract, Drawings for U.S. Appl. No. 11/640,589.
Office Action mailed Jan. 13, 2009 for U.S. Appl. No. 11/640,589.
U.S. Appl. No. 11/640,589, filed Dec. 12, 2006, Pettersen et al.

* cited by examiner

Primary Examiner — Krystine Breier

(57) ABSTRACT

A technique for providing short circuit protection in electrical systems used in hydrocarbon exploration and production and, more particularly, for such electrical systems comprising serially connected nodes, includes an apparatus and method. The apparatus, includes a power supply and a plurality of electrically serially connected application sensors downstream from the power supply. Each application sensor includes a sensing element; and a plurality of electronics associated with the sensing element. The electronics shut off upstream power to the downstream application sensors in the presence of a short circuit. The method includes serially supplying power to a downhole apparatus comprising a plurality of electrically serially connected downhole sensors; sensing, in series and upon receiving power from upstream, at each downhole sensor whether a downstream short circuit exists; and shutting off upstream power to the downstream downhole sensors in the presence of a short circuit.

31 Claims, 3 Drawing Sheets

SHORT CIRCUIT PROTECTION FOR SERIALLY CONNECTED NODES IN A HYDROCARBON EXPLORATION OR PRODUCTION ELECTRICAL SYSTEM

The current non-provisional patent application claims the priority of provisional patent application Ser. No. 60/806,604, filed on Jul. 5, 2006 by the same inventors, with the same title.

BACKGROUND OF THE INVENTION

1. Field of the Invention

The present invention pertains to short circuit protection in hydrocarbon exploration and production electrical systems and, more particularly, short circuit protection for such electrical systems comprising serially connected nodes.

2. Description of the Related Art

Short circuit protection systems are familiar protections for electrical systems. A short circuit may create dangerous conditions. For example, a short circuit may cause dangerous electrical loads for equipment that may damage electrical/electronic components of equipment, thereby rendering them inoperable. Dangerous electrical loads arising from short circuit conditions may also cause fires and other dangerous situations. The ubiquity of electricity in modern life has therefore led to much interest in short circuit protections.

The standard way of solving short circuit situations is to implement a hierarchy of automatic fuses. Each fuse has a certain current rating. The fuse trips when the current exceeds its rating. For example in a house, the main fuse has a higher current rating than the fuse for each individual power domain. In addition electrical devices like radios or personal computers ("PCs") may have an internal fuse as well, with lower current rating than the power domain it draws power from. The point with such a hierarchy is to reduce as much as possible the area that the short affects. This makes it easier to locate the problem and fix it while ensuring safety in the overall system. It also limits the area affected by the short.

These kinds of considerations take on more importance in some circumstances. A seismic survey system is typically laid out with a series of units connected together by a seismic cable in between. Cables, connectors and units transferring or relaying electrical power in a seismic survey system are subject to short circuit situations. There can be several hundred units in each power domain and 10 s of meters of cable between them, making the whole power domain span several kilometers. Thus, not only may there be a very large number of places in which a short circuit condition might occur, but they may be spread out over large distances. Locating and fixing a short circuit can therefore be a time consuming and difficult task.

In a seismic survey system, a hierarchy of automatic fuses such as that described above means that the power supply needs to include a fuse which will trip if there is a short anywhere on the line of sensors. The negative side of this solution is that the whole line of sensors loses power as long as there is a short anywhere on the line. It also is not possible to automatically know where on the line the short is, meaning it will take a long time to repair.

The present invention is directed to resolving, or at least reducing, one or all of the problems mentioned above.

SUMMARY OF THE INVENTION

The present invention comprises a method and apparatus providing short circuit protection in electrical systems used in hydrocarbon exploration and production and, more particularly, for such electrical systems comprising serially connected nodes. The apparatus, comprises a power supply and a plurality of electrically serially connected application sensors downstream from the power supply. Each application sensor includes a sensing element; and a plurality of electronics associated with the sensing element. The electronics shut off upstream power to the downstream application sensors in the presence of a short circuit. The method comprises serially supplying power to a downhole apparatus comprising a plurality of electrically serially connected downhole sensors; sensing, in series and upon receiving power from upstream, at each downhole sensor whether a downstream short circuit exists, and shutting off upstream power to the downstream downhole sensors in the presence of a short circuit.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention implements a system of automatic components protecting and diagnosing power domains consisting of a number of electronic units connected in series with a cable in between. The present invention implements a voltage controlled automatic switch in each unit together with a sequential system power up with a small delay between each node. The delay is used to measure the impedance of each segment before the switch is closed. Given no short circuit situation, the impedance should be above a fixed threshold, independent on the unit position on the line. After a successful power-up, the short circuit protection system continuously monitors the voltage, and turns off the switch if the voltage is forced below a set threshold (due to for example a short), thereby protecting the other units on the same power domain.

Figure 1:
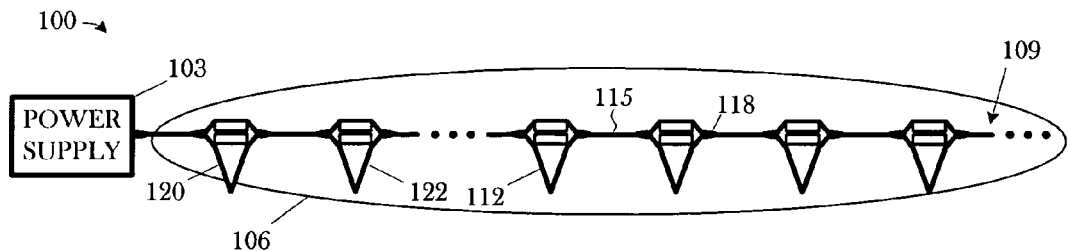
FIG. 1 depicts a portion of a seismic survey spread in which the present invention is applied.

FIG. 1 depicts a portion 100 of a seismic survey spread (not otherwise shown) in which the present invention is applied. The portion 100 includes a power supply 103 and a power domain 106 receiving power from the power supply 103. A seismic survey spread may, and typically will, comprise several power domains 106. The power domain 106 encompasses a seismic cable 109 comprising a plurality of seismic sensors 112 (only one indicated) connected by line segments 115 (only one indicated). Each seismic sensor 112 represents a node within the power domain 106. Each line segment 115, in the illustrated embodiment, may include a connector 118 (only one indicated) on either end. The seismic sensors 112 are serially connected on the seismic cable 109.

The line segments 115 and connectors 118 may be implemented in conventional fashion. The particular implementation may vary depending on the context in which the particular embodiment is employed. For instance, in a seabed survey, electrical connections must be water tight at depth, which would not be true of a land-based survey.

The power supply 103 is, in the illustrated embodiment, implemented in the data collection unit (not otherwise shown) for the seismic survey. As those in the art will appreciate, a seismic survey typically includes a data collection unit that performs several functions. It sends command and control signals; it provides power; it receives data generated by the seismic sensors; and sometimes it processes or pre-processes the data. In this embodiment, the data collection unit is used to provide power to the power domain 106. However, in alternative embodiments, the power supply 103 might be implemented in, for example, a power supply that is not a part of the data collection unit.

Figure 2:
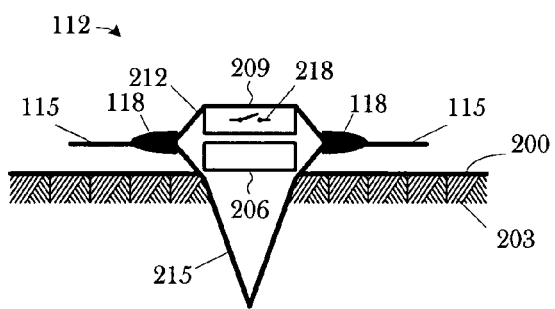
FIG. 2 conceptually illustrates one of the seismic sensors positioned on a surface of the ground as in a setup for a seismic survey.

FIG. 2 conceptually illustrates one of the seismic sensors 112 positioned on a surface 200 of the ground 203. The seismic sensors 112 of the illustrated embodiment are built substantially the same, although the invention does not require this. The seismic sensor 112 generally comprises a sensing element 206 and a set of electronics 209 situated in a housing 212. The housing 212 includes a spike 215 to help ensure good coupling between the sensing element 206 and the ground 203. Note that the invention is not limited by the structure or design of the housing 212. The sensing element 206 may be implemented in, for example, a conventional geophone as is common and well known in the art.

The electronics 209 are conventional except for the inclusion of a switch 218. The switch 218, conceptually shown as a single pole, single throw switch. The switch 218 controls the flow of power from the power supply 103 to sensors 112 downstream, i.e., down the seismic cable 115 in the direction away from the power supply 103. The invention admits variation in the implementation of the switch 218. However, one particular implementation is illustrated in FIG. 3.

Figure 3:
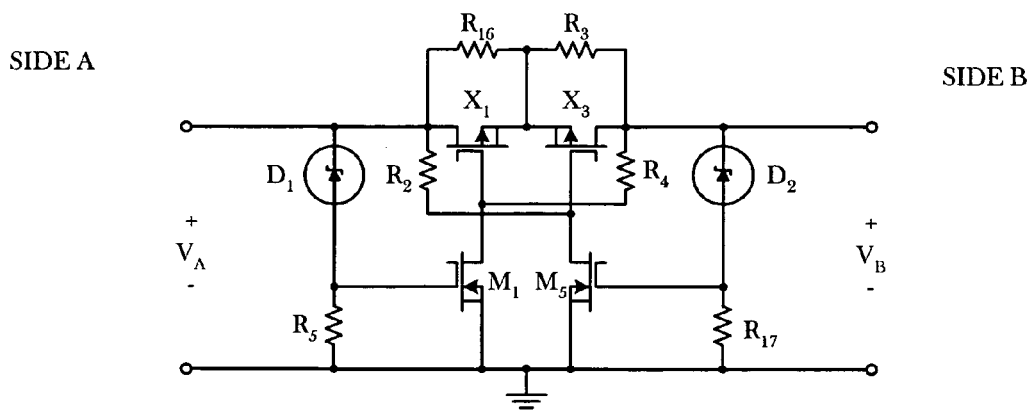
FIG. 3 diagrams a circuit by which the functionality of the present invention may be realized in the spread portion of FIG. 1.

More particularly, FIG. 3 is a schematic diagram of a circuit 300 by which the switch 218 is implemented in the illustrated embodiment. Table 1 sets forth exemplary values/part numbers for the components. For this example, "Side A" is the "upstream" or supply side, or the side proximate the power supply 103 and Side B is the downstream side, or the side most distal from the power supply 103. However, the circuit is symmetrical, so it works both ways. Note that the transistors $X_1$ and $X_3$ perform the actual switching function of the switch 218 in the manner discussed more fully below. Note that the circuit 300 provides power to the downstream node via a relatively high impedance resistance, i.e., $R_{16}$, $R_3$. This resistance is set high enough to not make the fuse (not shown) in the power supply 103 blow if there is a short circuit on the line. At the same time the impedance is low enough to raise the voltage $V_B$ above a set threshold under nominal circumstances.

TABLE 1

Exemplary Component List for FIG. 3

| Component | Type | Part No./Value |
|---|---|---|
| $D_1$ | Zener Diode | 1N4744 |
| $R_5$ | Resistor | 100k |
| $R_2$ | Resistor | 100k |
| $R_{16}$ | Resistor | 1k |
| $X_1$ | P-Channel Power MOSFET transistor | IRF9530 |
| $M_1$ | N-Channel MOSFET transistor | VN10LE |
| $R_3$ | Resistor | 1L |
| $X_3$ | P-Channel Power MOSFET transistor | IRF9530 |
| $M_5$ | N-Channel MOSFET transistor | VN10LE |
| $D_2$ | Zener Diode | 1N4744 |
| $R_{17}$ | Resistor | 100K |

Initially, power to the circuit 300 is off, and so both transistor $X_1$ and $X_3$ are also off. Power is applied at Side A. The transistor $X_1$ will already be conducting at this time due to its internal Drain to Source diode (not shown). The rising voltage $V_A$ will turn on the transistor $M_1$ when the voltage is above the limit set by the Zener diode $D_1$. When the transistor $M_1$ is turned on, the transistor $X_1$ will turn fully on. The resistor $R_3$ will try to raise the voltage $V_B$ at the output. Under normal conditions, the voltage will rise. When it is above a limit set by the Zener diode $D_2$, the transistor $M_5$ will start to conduct, turning on the transistor $X_3$. Power is then on to the next, downstream sensor 112 (if there is one). If there is a short or close to a short, the voltage $V_B$ at the output will not rise enough to turn on the transistor $X_3$. The transistor $X_3$ will then remain off until the short is removed, and power to the downstream seismic sensors 112 (if any) will remain interrupted until that time.

As was mentioned above, the invention admits variation in the implementation of the switch 218. Thus, FIG. 3 only shows an exemplary embodiment of the switch 218. Alternative embodiments might, for example, use comparators (not shown) instead of the Zener diodes $D_1$ and $D_2$. Using comparators makes it possible to define accurately when the protection should turn on and off, and even to introduce hysteresis in the system (e.g., turn off voltage is lower than turn on voltage) to minimize possible oscillations. Such an embodiment would also include capacitors (not shown) on the gates of the transistors $M_1$ and $M_5$ to define the power-up delay in each node.

Returning to FIG. 1, consider a scenario in which a short condition exits in one seismic cable 115, e.g., the seismic cable 115 between seismic sensor 120 and seismic sensor 122, at the time the portion 100 is powered up. Initially, power is off to the seismic sensors 112, including the seismic sensor 120. The switch 218, shown in FIG. 2, of each seismic sensor 112 is in the "off" position when no power is applied. Power is then applied from the power supply 103 to the power domain 106 through the seismic cable 115.

As the input voltage to the seismic sensor 120 rises, its switch 218 remains off due to the short, thereby not allowing its downstream neighbor, i.e., the seismic sensor 122, to receive full power. If the voltage $V_B$ does not rise above the set threshold, the switch 218 remains off. The seismic sensor 120 next to the short is still alive, and can send a message that there is a short between it and its downstream neighbor, as is discussed more fully below. Note that the scenario is exactly the same if the short is in the seismic sensor 122 itself rather than in the seismic cable. In case the short is removed, once the voltage $V_B$ is above the set threshold, the switch 218 turns on, and the downstream sensor 122 receives full power. The downstream sensor goes through the same process to see if its downstream sensor's cable 115 is operable or not, and so it continues until all the seismic sensors 112 are powered, given that no short circuit exist.

Note that current, which nominally breaks a fuse once it is over the fuse's rating in conventional systems, has no impact on this short circuit protection scheme. With the situation in FIG. 1, everything downstream of the short circuit will be without power. (Conversely, everything upstream from the short circuit will be powered.) This is still better than what a conventional fuse solution would give. In addition the system can tell exactly the where the problem is.

Now consider the case where the power domain 106 is up and running without problems, and a short occurs somewhere within the power domain 106 during operation. In this case, the voltage on the segment where the short occurs drops very fast due to the short circuit. Once the voltage is under a defined threshold the switch 218 in the immediately upstream seismic sensor 112 opens, thereby protecting the rest of the power domain 106 upstream of the short circuit from loosing power. Depending on the set threshold, resistance along the line and the capacitance on each seismic sensor 112, some neighboring seismic sensors 112 to the shorted section might temporarily lose power. Such a temporary power loss would be due to the short circuit propagating faster than the short circuit protection described herein reacts. These seismic sensors 112, however, will receive power again within a few seconds once the shorted section is switched off. After these few seconds of interruption, the line of seismic sensors 112 is up and running again, with the shorted section un-powered and flagged as shorted.

The present invention can also provide an indicator of where the fault may be found in this particular embodiment. When $M_1$ or $M_5$ is off, there is a short to the upstream or downstream side, respectively. This can be monitored by using, for example, a comparator (not shown), and a message can be sent to higher level units to alert the system users. The message may be relatively simple or relatively complex from a technological perspective. For instance, the message may be a light on the unit's control panel used by the system operator or an audible alarm. Or, the message might be a "packet" transmitted to the operator over a communications channel employing a transmission control protocol/Internet protocol ("TCP/IP"), or some other suitable communications protocol.

Figure 4:
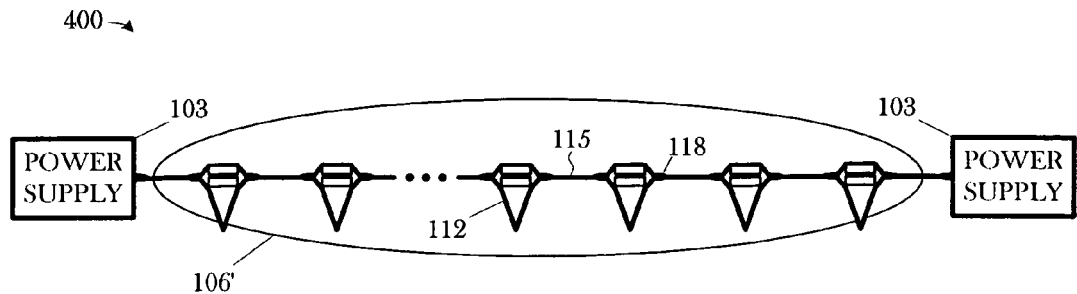
FIG. 4 depicts a second portion of a seismic survey spread in which the present invention may be applied.

The illustrated embodiment also provides a switch, such as the switch 218, in the power supply 103. In the embodiment of FIG. 4, discussed more fully below, such a switch could be provided in both power supplies 103. However, this is not required for the practice of the invention. Furthermore, the invention does not necessarily require that such a switch 218 be found in each seismic sensor 112. The benefits of the present invention can nevertheless be more fully realized by positioning a switch such as the switch 218 in each of the seismic sensors 112 in the power domain 106 and in each power supply 112.

Thus, in this particular aspect and as shown in the embodiments FIG. 1 and FIG. 4, the invention includes a seismic surveying apparatus, comprising a power supply 103 and a plurality of electrically serially connected seismic sensors 112. The seismic sensors 112 are "downstream" from the power supply 103 in the sense that power flows to them from the power supply 103. (Similarly, the seismic sensor 122 is downstream from the seismic sensor 120 in the sense that power flows from the power supply 103 to the seismic sensor 122 through the seismic sensor 120.) Conversely, the power supply 103 is "upstream" from the seismic sensors 112. Turning now to FIG. 2, each seismic sensor 112 includes a sensing element 206 and a plurality of electronics 209 associated with the sensing element 206. The electronics 209 shut off upstream power from the power supply 103 to the downstream seismic sensors 112 in the presence of a short circuit. More particularly, the electronics 209 transmit power from the power supply 103 to a downstream seismic sensor 112 in the absence of a short circuit and shut off power to the downstream seismic sensor 112 in the presence of a short circuit.

As previously mentioned, the invention admits variation in implementation. For instance, consider the embodiment of FIG. 4. This particular embodiment a portion 400 of a seismic survey spread (not otherwise shown) in including two power supplies 103, one on either end of the seismic cable 109. Since power is supplied from both sides, the whole line of seismic sensors 112 continues to function without problems even when there is a short present. The only exception would be where the short occurs in the seismic sensor 112, whereupon only that seismic sensor 112 will be out. The survey crew can then take their time to drive to the shorted section—identified as described above—without stopping production.

The symmetrical design of the circuit 300, shown in FIG. 3, is advantageous in this embodiment. As explained above, the circuit 300 is symmetrical so that it will function regardless of whether power is applied from Side A or Side B. Depending on the short location and the position of the seismic sensor 112 on the seismic cable 115, a seismic sensor 112 may receive power on either of Side A or Side B. The symmetrical design of the circuit 300 is therefore advantageous since it operates in the same manner regardless of which side receives the power.

The above embodiments in FIG. 1 and FIG. 4 are both land based surveys. However, the invention is not so limited. Marine seismic surveys come in two basic types—towed streamer surveys and seabed surveys. The invention may be employed in either type of marine survey. Both streamers and ocean bottom cables used in seabed surveys may be considered "seismic cables", although some aspects of their structure, operation, and use differ from that of seismic cables used in land-based surveys in ways well known to the art. Consequently, matters of design, construction and operation not relevant to the present invention are not further discussed for the sake of clarity and so as not to obscure the present invention.

Figure 5:
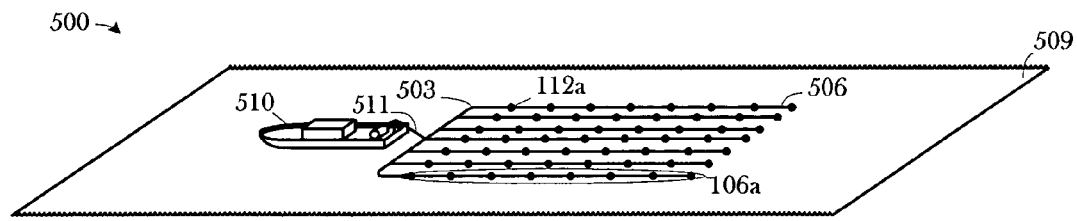
FIG. 5-FIG. 6 illustrate a towed streamer and a seabed marine survey, respectively, in which the present invention may be employed.
Figure 6:
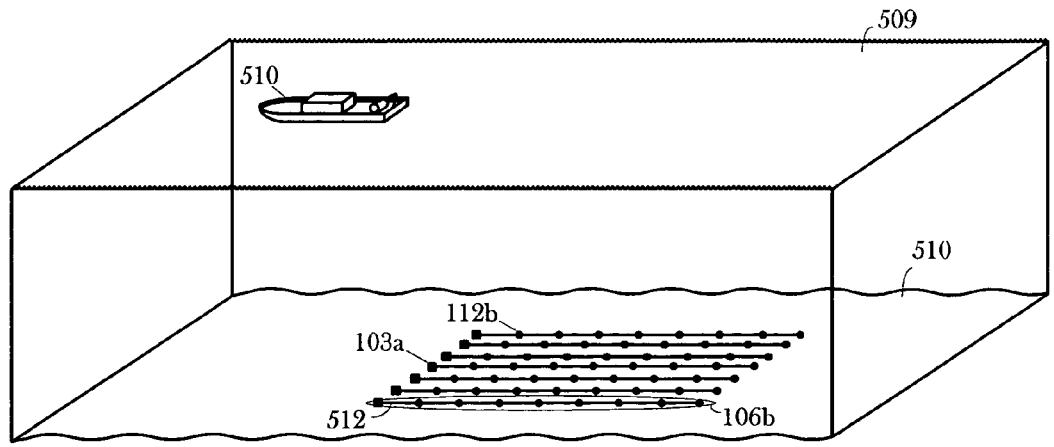

More particularly, in towed streamer surveys, such as the survey 500 shown in FIG. 5, arrays 503 of seismic streamers 506 (only one indicated) containing seismic sensors 112a (only one indicated) are towed by a survey vessel 510 at or near the water's surface 509. The sensing element (not shown) of the seismic sensors 112a may be, for example, hydrophones and the electronics (not shown) of each includes a switch 218, such as that shown in FIG. 2. Power is supplied to the seismic sensors 112a from a data collection unit (not shown) on the vessel 510 through the tow cable 511 and the streamers 506. In such a survey, each streamer 506 may, for example, constitute a separate power domain 106a, in which the electronics of the seismic sensors 112a comprise a plurality of serially connected nodes. The short circuit protection works as is described above for the embodiment of FIG. 1.

In seabed surveys, ocean bottom cables ("OBCs") 512 (only one indicated) are arrayed on the seabed 515 from the vessel 510 at the water's surface 509. Each OBC 512 comprises a plurality of seismic sensors 112b. The sensing elements (not shown) of the seismic sensors 112b may be, for example, either hydrophones or geophones. The electronics (not shown) of each will include a switch 218, such as that shown in FIG. 2. Each OBC 512 includes a power supply 103a, as well, which provides power to the seismic sensors 112b over the OBCs 512. Each OBC 512 may define a power domain 106b, in which the electronics of the seismic sensors 112b comprises a plurality of serially connected nodes. The short circuit protection works as is described above for the embodiment of FIG. 1.

Figure 7A:
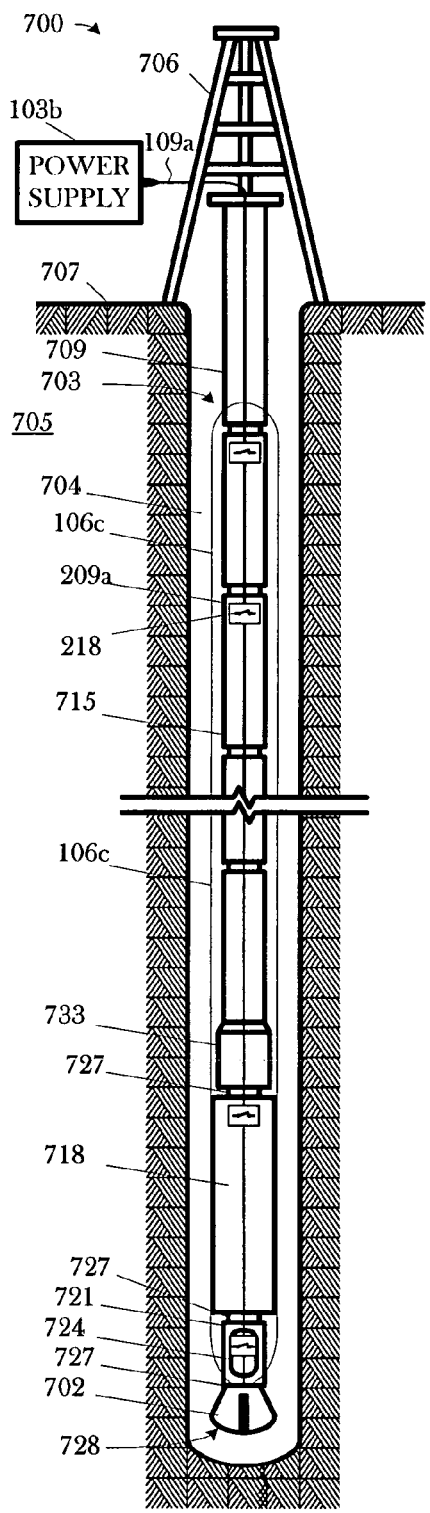
FIG. 7A-FIG. 7B conceptually illustrate a drilling operation in which the present invention may be used.

Furthermore, all the embodiments disclosed above are in the context of a seismic survey. However, the invention is not limited to seismic applications and may also be employed in downhole applications. FIG. 7A schematically illustrates a drilling operation 700 in which a drill string 703, including a bit 702, is drilling a borehole 704 in the ground 705 beneath the surface 707 thereof. The drilling operation 700 includes a rig 706 from which the drill string 703 is suspended through a kelly 709. Also within the drill string 703 are tools (not indicated) such as jars and stabilizers. Drill collars (also not indicated) and heavyweight drill pipe 718 are located near the bottom of the drill string 703. A data and crossover sub 721 is included just above the bit 702.

The drill string 703 will include a variety of instrumented tools for gathering information regarding downhole drilling conditions. For instance, the bit 702 is connected to a data and crossover sub 721 housing a sensor apparatus 724 including an accelerometer (not otherwise shown). The accelerometer is useful for gathering real time data from the bottom of the hole. For example, the accelerometer can give a quantitative measure of bit vibration. The bit 702, data and crossover sub 721, and sensor apparatus 724 generally comprise, in part, a bottom-hole assembly 728, although the constitution of the bottom-hole assembly 728 is not material to the practice of the invention.

The joints 727 between these sections of the drill string 703, as well as the other joints (not indicated) of the drill string 703 comprise joints such as are known to the art. Many types of data sources may and typically will be included. Exemplary measurements that may be of interest include hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth.

Figure 7B:
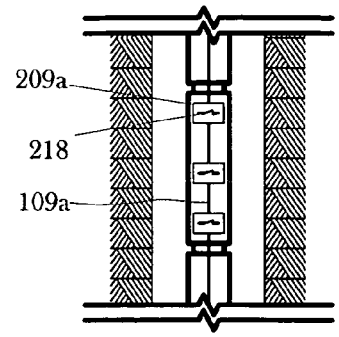

Each of the instrumented sections of the drill string 703 will include electronics 209a (only one indicated) that comprises at least in part a switch 218 (only one indicated). The switch 218 may also be implemented using, for example, the circuit 300 shown in FIG. 3. Note that each instrument (e.g., the accelerometer of the sensor apparatus 721) may constitute an electrical node and therefore may have an associated switch 218. Accordingly, an instrumented section may have multiple electrical nodes with multiple associated switches 218, as is shown in FIG. 7B.

Returning to FIG. 7A, the electronics 209a receive power downhole is from a power supply 103b at the surface 707 over a line 109a. The power supply 103b will typically be some type of data collection system (not otherwise shown). The line 109a may be a cable or a lead. The instrumented sections therefore constitute a power domain 106c in which the nodes (i.e., the electronics 209a) are serially connected. The short circuit protection works as is described above for the embodiment of FIG. 1.

Figure 8B:
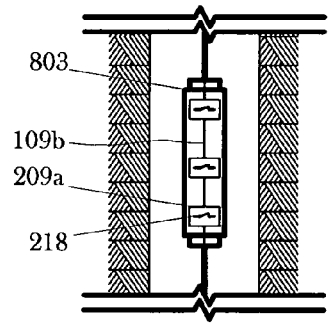
FIG. 8A-FIG. 8B conceptually illustrate a portion of wireline logging operation in which the present invention may be used.
Figure 8A:
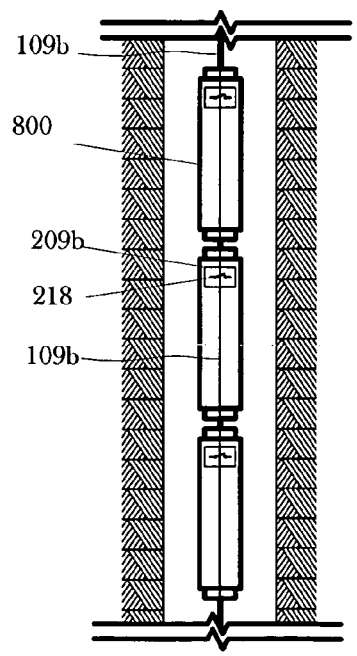

The present invention may also be employed in other downhole contexts, such as completion and logging. FIG. 8A shows multiple wireline logging tools 800 (only one indicated) used to collect data during the drilling process. Each tool 800 comprises electronics 209b that include a switch such as the switch 218, first shown in FIG. 2, and one or more sensors (not shown). Power is provided from the surface through the cable 109b. Note that individual tools 800 may include multiple sensors and therefore multiple sets of electronics 209b, each with a switch. Thus, multiple nodes may be present in a single tool, such as in the tool 803, shown in FIG. 8B. Returning to FIG. 8A, the electronics 209b therefore comprise a plurality of serially connected nodes in a power domain 106c in which the short circuit protection works as is described above for the embodiment of FIG. 1.

Thus, in this particular aspect and as shown in the embodiments of FIG. 7A-FIG. 8B, the invention includes a downhole apparatus, comprising a power supply 103a and a plurality of electrically serially connected downhole sensors. Each downhole sensor includes a sensing element and a plurality of electronics 209a, 209b associated with the sensing element. The electronics 209 shut off upstream power from the power supply 103a to the downstream downhole sensors in the presence of a short circuit. More particularly, the electronics 209a, 209b transmit power from the power supply 103a to a downstream downhole sensor in the absence of a short circuit and shuts off power to the downstream downhole sensor in the presence of a short circuit.

The short circuit protection system may also be used in other applications employing an electrical circuit. For example, the short circuit protection system may be used in other hydrocarbon exploration and production applications employing electrical oilfield components, such as gauges, sensors, valves, sampling devices, a device used in intelligent or smart well completion, temperature sensors, pressure sensors, flow-control devices, flow rate measurement devices, oil/water/gas ratio measurement devices, scale detectors, actuators, locks, release mechanisms, equipment sensors (e.g., vibration sensors), sand detection sensors, water detection sensors, data recorders, viscosity sensors, density sensors, bubble point sensors, pH meters, multiphase flow meters, acoustic sand detectors, solid detectors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers, perforating devices, shape charges, firing heads, locators, strain gauges, pressure transducers, and other downhole devices.

The present invention therefore provides short circuit protection in hydrocarbon exploration and production electrical systems and, more particularly, for such electrical systems comprising serially connected nodes. The present invention provides automatic short circuit localization, with very limited disruption in operations due to short circuits, and a cascaded start-up. Some embodiments even provide an indication to the system operator of where the short circuit is, which facilitates rapid repair. Some embodiments supply power from both ends of the serially connected nodes, which permits superior operation relative to conventional practice even in the presence of a short.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. For instance, in the embodiment of FIG. 1, the power supply 103 may be situated in the middle of the seismic cable 109 such that there are two strings of serially connected seismic sensors 112 such that there are two sets of seismic sensors 112 downstream from the power supply 103, one on either side thereof. It is therefore evident that the particular embodiments disclosed above may be altered or modified and all such variations are considered within the scope and spirit of the invention. Accordingly, the protection sought herein is as set forth in the claims below.

What is claimed:

1. A seismic surveying apparatus, comprising:
a power supply; and
a plurality of electrically and serially connected seismic sensors downstream from the power supply, each seismic sensor including:
a sensing element; and
a plurality of electronics associated with the sensing element, the electronics shutting off upstream power to the downstream seismic sensors in the presence of a short circuit while upstream power remains supplied to upstream seismic sensors.

2. The seismic surveying apparatus of claim 1, wherein the power supply transmits power from the power supply to the downstream seismic sensors in the absence of the short circuit.

3. The seismic surveying apparatus of claim 2, wherein the electronics include a switch that controls the transmission and shutting off of upstream power.

4. The seismic surveying apparatus of claim 3, wherein the switch controls the transmission and shutting off of upstream power upon receipt of upstream power in the presence of the short circuit.

5. The seismic surveying apparatus of claim 1, wherein the electronics shut off upstream power upon receipt of upstream power in the presence of the short circuit.

6. The seismic surveying apparatus of claim 1, wherein the power supply powers the seismic sensors from one end of the serial connection.

7. The seismic surveying apparatus of claim 6, further comprising a second power supply supplying power from the other end of the serial connection.

8. A seismic surveying apparatus, comprising:
a power supplying means for supplying power; and
a plurality of electrically and serially connected seismic signal sensing means for sensing seismic signals downstream from the power supplying means, each seismic signal sensing means including:
a sensing means for sensing a characteristic of a seismic signal; and
a shutting off means associated with the sensing means for shutting off upstream power to downstream seismic signal sensing means in the presence of a short circuit while upstream power remains supplied to upstream seismic signal sensing means.

9. The seismic surveying apparatus of claim 8, wherein the power supplying means transmits power from the power supplying means to the downstream seismic signal sensing means in the absence of the short circuit.

10. The seismic surveying apparatus of claim 8, wherein the shutting off means shuts off upstream power upon receipt of upstream power in the presence of the short circuit.

11. The seismic surveying apparatus of claim 8, wherein the power supplying means powers the seismic signal sensing means from one end of the serial connection.

12. The seismic surveying apparatus of claim 11, further comprising a second power supplying means supplying power from the other end of the serial connection.

13. A downhole apparatus, comprising:
a power supply; and
a plurality of electrically and serially connected downhole sensors downstream from the power supply, each downhole sensor including:
a sensing element; and
a plurality of electronics associated with the sensing element, the electronics shutting off upstream power to the downstream downhole sensors in the presence of a short circuit while upstream power remains supplied to upstream downhole sensors.

14. The downhole apparatus of claim 13, wherein the power supply transmits power from the power supply to the downstream downhole sensors in the absence of the short circuit.

15. The downhole apparatus of claim 14, wherein the electronics include a switch that controls the transmission and shutting off of upstream power.

16. The downhole apparatus of claim 15, wherein the switch controls the transmission and shutting off of upstream power upon receipt of upstream power in the presence of the short circuit.

17. The downhole apparatus of claim 13, wherein the electronics shut off upstream power upon receipt of upstream power in the presence of the short circuit.

18. A downhole apparatus, comprising:
a power supplying means for supplying power; and
a plurality of electrically and serially connected seismic signal sensing means for sensing signals downhole, the downhole signal sensing means being downstream from the power supplying means, each downhole signal sensing means including:
a sensing means for sensing a characteristic of a downhole signal; and
a shutting off means associated with the sensing means for shutting off upstream power to downstream downhole signal sensing means in the presence of a short circuit while upstream power remains supplied to upstream downhole signal sensing means.

19. The downhole apparatus of claim 18, wherein the power supplying means transmits power from the power supplying means to the downstream downhole signal sensing means in the absence of the short circuit.

20. The downhole apparatus of claim 19, wherein the shutting off means includes a switch that controls the transmission and shutting off of upstream power.

21. The downhole apparatus of claim 18, wherein the shutting off means shuts off upstream power upon receipt of upstream power in the presence of the short circuit.

22. A method for detecting a short circuit during a seismic survey, the method comprising:
serially supplying power to a seismic survey system comprising a plurality of electrically and serially connected seismic sensors;

sensing, in series and upon receiving power from upstream, at each seismic sensor whether a downstream short circuit exists; and shutting off upstream power to the downstream seismic sensors in the presence of a short circuit while upstream power remains supplied to upstream seismic sensors, wherein the upstream power is shut off using a plurality of electronics associated with a sensing element of the seismic sensor.

23. The method of claim 22, wherein the power supply powers the seismic sensors from one end of the serial connection.

24. The method of claim 23, further comprising a second power supply supplying power from the other end of the serial connection.

25. The method of claim 22, further comprising locating the short circuit when one occurs.

26. A method for detecting a short circuit during a seismic survey, the method comprising:

serially supplying power to a downhole apparatus comprising a plurality of electrically and serially connected downhole sensors;

sensing, in series and upon receiving power from upstream, at each downhole sensor whether a downstream short circuit exists; and shutting off upstream power to the downstream downhole sensors in the presence of a short circuit while upstream power remains supplied to upstream downhole sensors, wherein the upstream power is shut off using a plurality of electronics associated with a sensing element of the seismic sensor.

27. The method of claim 26, wherein the power supply powers the downhole sensors from one end of the serial connection.

28. The method of claim 27, further comprising a second power supply supplying power from the other end of the serial connection.

29. The method of claim 26, further comprising locating the short circuit when one occurs.

30. An apparatus, comprising:

a power supply; and a plurality of electrically and serially connected application sensors for hydrocarbon exploration and production downstream from the power supply, each application sensor including:

a sensing element; and a plurality of electronics associated with the sensing element, the electronics shutting off upstream power to the downstream application sensors in the presence of a short circuit while upstream power remains supplied to upstream application sensors.

31. The apparatus of claim 30, wherein the application sensors comprise seismic sensors or downhole sensors.

* * * * *

UNITED STATES PATENT AND TRADEMARK OFFICE
CERTIFICATE OF CORRECTION

PATENT NO. : 8,923,095 B2
APPLICATION NO. : 11/640786
DATED : December 30, 2014
INVENTOR(S) : Jostein Engeseth Fonneland and Alain Rhelimi It is certified that error appears in the above-identified patent and that said Letters Patent is hereby corrected as shown below:

Title Page

Item (12) delete "Pettersen et al.," and insert --Fonneland et al.--.

Item (75) the first Inventor's name should be corrected from: Jostein Fonneland Pettersen to: Jostein Engeseth Fonneland Signed and Sealed this
Twenty-first Day of April, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,923,095 B2 |
| APPLICATION NO. | : 11/640786 |
| DATED | : December 30, 2014 |
| INVENTOR(S) | : Petterson et al. |

It is certified that error appears in the above-identified patent and that said Letters Patent is hereby corrected as shown below:

Title Page,

Item [75], Inventors, "Jostein Engeseth Fonneland" (as corrected to read in the Certificate of Correction issued April 21, 2015) is deleted and patent is returned to its original state with inventor name in patent to read --Jostein Fonnelland Petterson--.

Item [12], "Fonneland et al." should read --Petterson et al.--.

Signed and Sealed this
Twenty-first Day of July, 2015

Michelle K. Lee
*Director of the United States Patent and Trademark Office*